UNITED STATES PATENT OFFICE.

BYRD SMITH AND FRANK HOWARD, OF DEVINE, TEXAS.

INSECTICIDE.

SPECIFICATION forming part of Letters Patent No. 410,036, dated August 27, 1889.

Application filed June 15, 1889. Serial No. 314,474. (No specimens.)

*To all whom it may concern:*

Be it known that we, BYRD SMITH and FRANK HOWARD, citizens of the United States, residing at Devine, in the county of Medina and State of Texas, have invented a new and useful Insecticide, of which the following is a specification.

This invention has relation to insecticides; and the same consists of the following ingredients in substantially the proportions given, said ingredients being mixed thoroughly in the ordinary manner and without any particular order; spirits of turpentine, one-half gallon; crude carbolic acid, one-half gallon; benzine, one gallon; bisulphide of carbon, three gallons; brimstone, two pounds.

The above ingredients thoroughly mixed in substantially the proportions given obtain substantially the best result; but we do not limit our invention to any particular proportions or to any manner of compounding the same, as the ingredients themselves in whatever reasonable proportions they may be compounded form an extremely efficient insecticide, to be used in any manner desired.

Of course it will be understood that the liquid is fired when used. If convenient, a quantity should be poured into the den of the insect and then lighted.

Having described our invention, what we claim is—

The herein-described insecticide, composed of the following ingredients: spirits of turpentine, carbolic acid, (preferably crude,) benzine, bisulphide of carbon, and brimstone, substantially as specified.

In testimony that we claim the foregoing as our own we have hereto affixed our signatures in presence of two witnesses.

BYRD SMITH.
FRANK HOWARD.

Witnesses:
J. A. WHITFIELD,
W. H. H. DAVIS.